United States Patent
Chereshnev

(10) Patent No.: US 10,873,577 B2
(45) Date of Patent: Dec. 22, 2020

(54) IDENTIFYING AND AUTHORIZING USER DATA OVER A NETWORK BASED ON BIOMETRIC AND STATISTICAL DATA

(71) Applicant: Evgeny Chereshnev, London (GB)

(72) Inventor: Evgeny Chereshnev, London (GB)

(*) Notice: Subject to any disclaimer, the term of this patent is extended or adjusted under 35 U.S.C. 154(b) by 120 days.

(21) Appl. No.: 15/998,562

(22) Filed: Aug. 17, 2018

(65) Prior Publication Data
US 2020/0059467 A1    Feb. 20, 2020

(51) Int. Cl.
*H04L 29/06* (2006.01)
*H04L 9/06* (2006.01)

(52) U.S. Cl.
CPC ........ *H04L 63/0861* (2013.01); *H04L 9/0637* (2013.01); *H04L 63/102* (2013.01)

(58) Field of Classification Search
CPC .. H04L 63/0861; H04L 63/102; H04L 9/0637
USPC .......................................................... 726/4
See application file for complete search history.

(56) References Cited

U.S. PATENT DOCUMENTS

| | | | | |
|---|---|---|---|---|
| 8,387,110 B1* | 2/2013 | Cooper | ................ | H04L 63/102 726/1 |
| 10,069,824 B2* | 9/2018 | Dascola | .............. | H04L 63/0892 |
| 10,218,695 B1* | 2/2019 | Jain | ....................... | H04L 63/102 |
| 2006/0282660 A1* | 12/2006 | Varghese | .............. | G07F 7/1041 713/155 |
| 2011/0154497 A1* | 6/2011 | Bailey, Jr. | ........... | H04L 63/0861 726/25 |
| 2013/0036458 A1* | 2/2013 | Liberman | ............. | H04L 9/3231 726/6 |
| 2014/0068740 A1* | 3/2014 | LeCun | ................. | G06K 9/6271 726/7 |
| 2015/0149837 A1* | 5/2015 | Alonso | ............. | G06K 7/10227 714/57 |
| 2016/0180150 A1* | 6/2016 | Negi | ....................... | G06F 16/51 382/118 |
| 2017/0091595 A1* | 3/2017 | Wang | ................. | G06K 9/00885 |
| 2017/0213221 A1* | 7/2017 | Kurian | ............... | G06Q 20/4014 |
| 2019/0089701 A1* | 3/2019 | Mercury | ............... | G06F 16/285 |

OTHER PUBLICATIONS

Nagasundara et al., "Feature selection and Indexing of Online Signatures", Apr. 12, 2012 IEEE pp. 408-414. (Year: 2012).*

* cited by examiner

*Primary Examiner* — Khalil Naghdali

(57) ABSTRACT

The subject disclosure relates to employing sourcing and generation components to facilitate a generation of identity data. In an example, a system comprising a memory that stores computer executable components and a processor that executes the computer executable components stored in the memory, comprise a sourcing component and a generation component. In an aspect, the sourcing component can source, by a user device comprising the processor, a set of biometric data and a set of statistical data. In another aspect, a generation component can generate, by the user device, a set of identification data based on an interpolation of the set of biometric data and the set of statistical data.

20 Claims, 9 Drawing Sheets

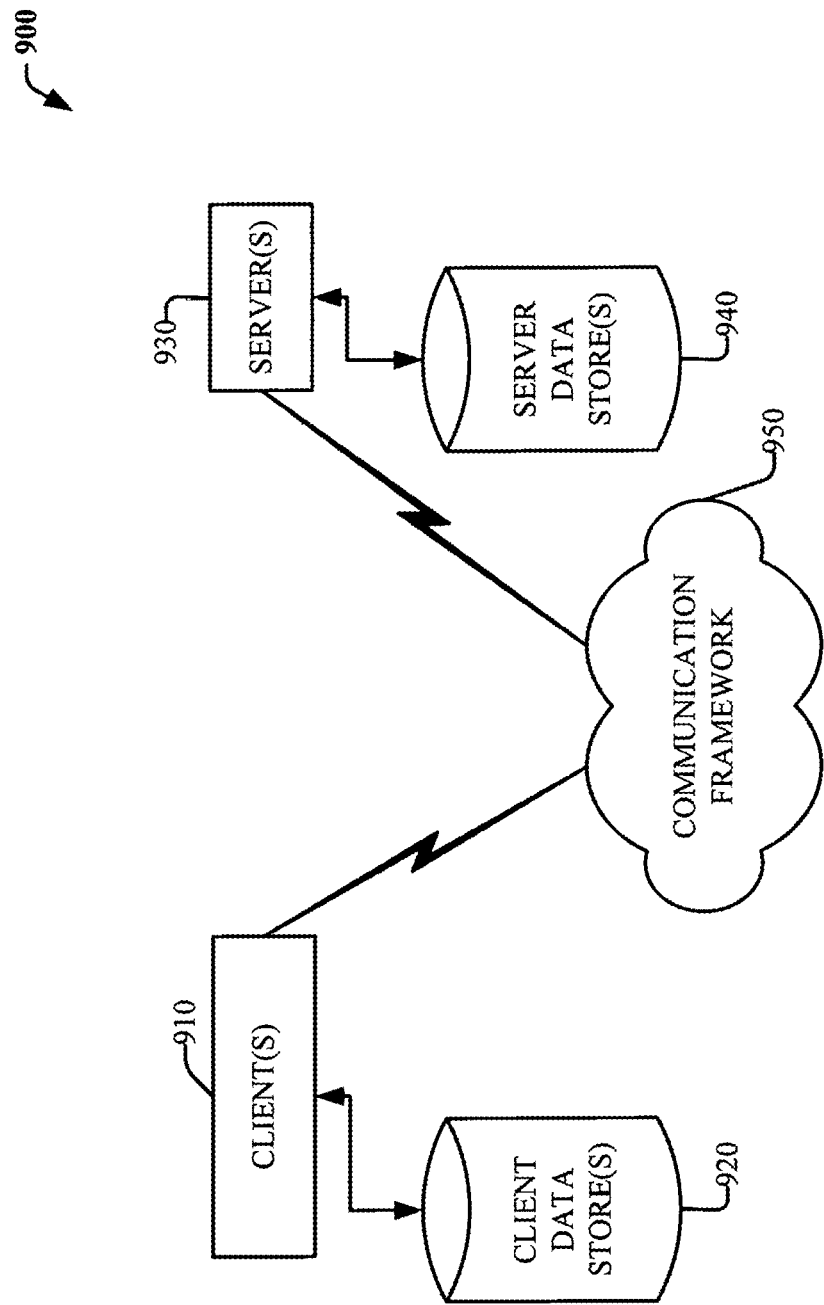

IDENTIFYING AND AUTHORIZING USER DATA OVER A NETWORK BASED ON BIOMETRIC AND STATISTICAL DATA

CROSS-REFERENCE TO RELATED APPLICATION

This application claims priority to and claims the benefit of priority to U.S. Patent Application No. 62/545,513, filed on Aug. 15, 2017 and entitled "Identifying and Authorizing User Data Over a Network Based on Biometric and Statistical Data". The entirety of the disclosure of the aforementioned application is considered part of, and is incorporated by reference in, the disclosure of this application.

BACKGROUND

Most modern computer-based services, applications, and accounts require a user to input login and password credentials to access such services, applications, and accounts. However, modern computing power has become so great that traditional access granting mechanisms such as logins and passwords have become vulnerable to cybersecurity breaches. Furthermore, security protocols attempt to increase the security of user accounts by creating unique pairs of logins and unique passwords with longer and more unique alphanumeric arrangements and symbols.

However, even such enhanced username and passwords configurations are vulnerable to security breaches. Furthermore, most users use the same e-mail and password for multiple services creating easy opportunities for hackers to commit identity theft by, for instance, attacking the least secure username and password service and using the same credentials to break through more secure access walls. Another vulnerability that exists relates to physical paper and plastic forms of identification (e.g., driver license, passport, etc.) such as government issued identification. In order to authenticate the validity of such forms of identification an interested party needs to cross-reference such physical identification with a relevant government database. This extra step is not only burdensome but also dilutes the relevancy of having a physical government identification in the first place. Furthermore, a physical identification is vulnerable to loss, theft, counterfeiting and in order to be useful, should be toted around by its owner.

In another aspect, a privacy vulnerability also exists such that users whom create computer-implemented accounts often utilize single sign-on features to gain access to several independent software systems. As such, a user can login with a single identification and password to gain access to a connected system of software elements without using different usernames or passwords. However, in most instances, single-sign on services, are tracking user information and data (e.g., location, purchasing habits, etc.) and sell such information to third parties in order to generate new and/or additional revenue. Thus, the single-sign on feature provides a layer of privacy vulnerability to users whom utilize such feature. Accordingly, new systems, methods and devices are needed to address the many prevalent security and privacy issues related to conventional technologies and security techniques.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein are systems, devices, apparatuses, computer program products and/or computer-implemented methods that employ grouping components to group oil and gas exploration equipment failure data into one or more failure type groups and facilitate identification of equipment failure types.

According to an embodiment, a system is provided. The system comprises a processor that executes computer executable components stored in memory. The computer executable components comprise a sourcing component that sources, by a user device comprising the processor, a set of biometric data and a set of statistical data. In another aspect, the computer executable components comprise a generation component that generates, by the user device, a set of identification data based on an interpolation of the set of biometric data and the set of statistical data.

BRIEF DESCRIPTION OF THE DRAWINGS

FIG. 9 illustrates a block diagram of an example, non-limiting operating environment 1700 in which one or more embodiments described herein can be facilitated.

In addition, an appendix submitted herewith relates to various embodiments and/or features associated with the disclosed subject matter, and this appendix is considered part of this patent specification.

DETAILED DESCRIPTION

The following detailed description is merely illustrative and is not intended to limit embodiments and/or application or uses of embodiments. Furthermore, there is no intention to be bound by any expressed or implied information presented in the preceding Background or Summary sections, or in the Detailed Description section. One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

In an aspect, disclosed herein are devices, systems, and methods for generating a tamper-proof identification tool and mechanism for granting authorization of a person (e.g., user) to access a range of services and/or perform a range of tasks (e.g., in the physical world, in an internet environment, within an internet-enabled physical environment, etc.). In an aspect, the technology can include the generation of a digital DNA (e.g., also referred to as dDNA) for each individual user. A digital DNA can include a secure record of a user's transactions and activities corresponding to real-time biometric data and statistical data of respective users. In an aspect, the dDNA represents a multi factor-identification and authorization tool belonging to a user and capable of use as a secure system and device to prove a respective person's identity at any time and any place.

The Appendix submitted herewith relates to various embodiments and/or features associated with the disclosed subject matter, and is considered part of this patent specification.

Figure 1:
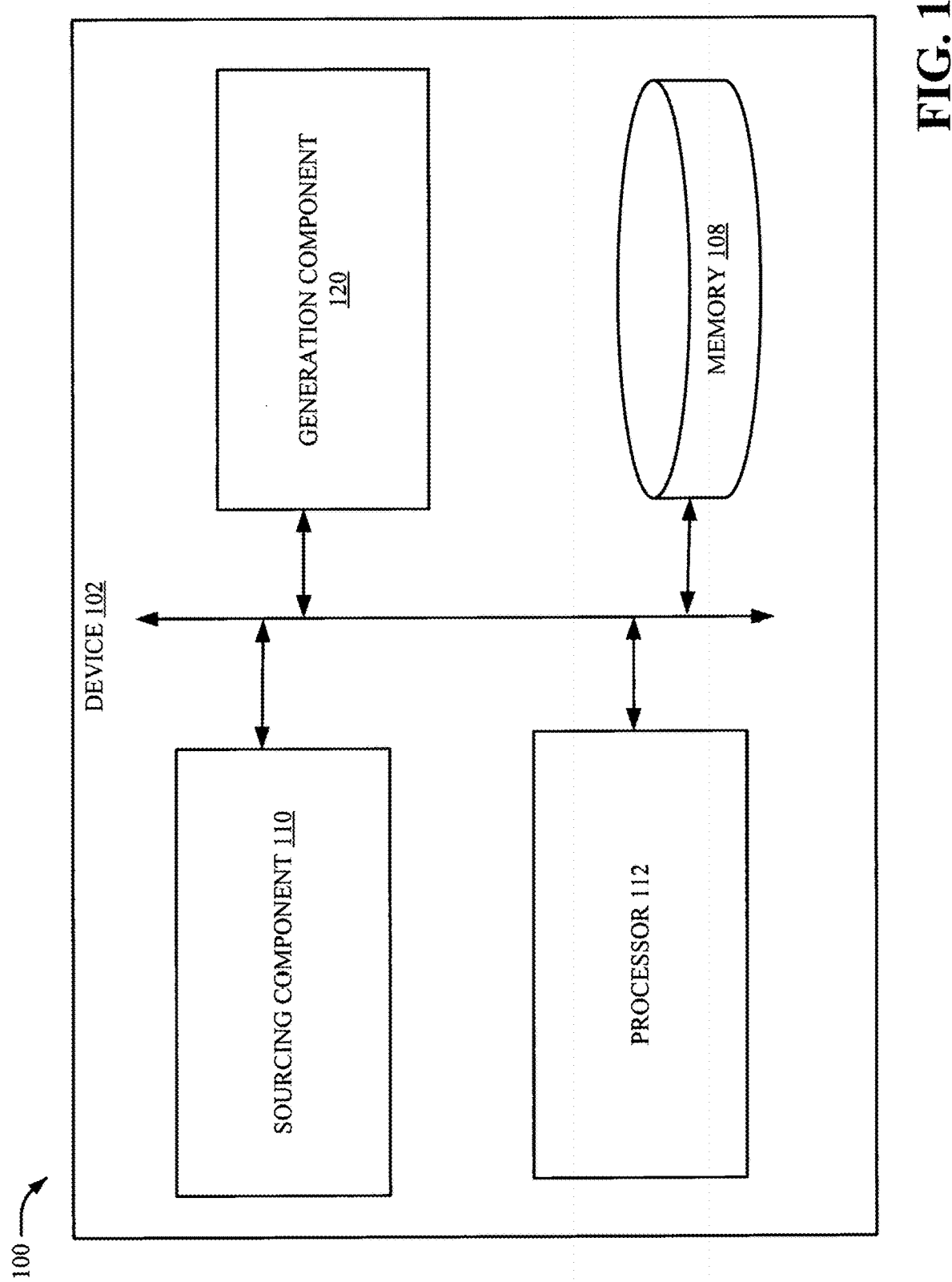
FIG. 1 illustrates a block diagram of an example, non-limiting system 100 that can facilitate a generation of customized identification data corresponding to a user device in accordance with one or more embodiments described herein.

FIG. 1 illustrates a block diagram of an example, non-limiting system 100 that can facilitate a generation of customized identification data corresponding to a user device in accordance with one or more embodiments described herein. In an aspect, system 100 can include a memory 108 that stores computer executable components and a processor 112 that executes the computer executable components stored in the memory 108. In an aspect, the computer executable components of system 100 can comprise a sourcing component 110 and a generation component 120. In an aspect, the sourcing component 110 can source, by a user device 102 comprising the processor, a set of biometric data and a set of statistical data. In another aspect, the generation component 120 can generate, by the user device, a set of identification data based on an interpolation of the set of biometric data and the set of statistical data.

In an aspect, device 102 can be any of a range of devices (e.g., smart phone, tablet, desktop computer, set-top box, etc.), and in a non-limiting example embodiment, device 102 can be a wearable digital device (e.g., a wrist-mountable bracelet or watch). In an aspect, device 102 can utilize system 100, such that the computer-executable software components of system 100 can be stored in memory 108 of device 102. Furthermore, device 102 can comprise processor 112 that executes instructions associated with the components stored in memory 108. In an aspect, a sourcing component 110 can source, by user device 102 comprising the processor 112, a set of biometric data and a set of statistical data. In an aspect, biometric data can include, but is not limited to, data representing a user heartbeat pattern, voice pattern (e.g., tone, frequency, lingual, and speaking uniqueness), walking pattern (e.g., gait, walking style to determine identity, walking data detected by a gyroscope), metabolic information (e.g., serotonin levels, dopamine levels, endorphin levels, testosterone levels, and other such hormones), gestures (e.g., we wave differently due to our differences in muscle strength, such data can be detected using a gyroscope, etc.), wake/sleep patterns (e.g., time a user sleeps, longevity of sleep, etc.), visual patterns, facial patterns, fingerprint recognition, finger geometry data, hand geometry data (e.g., geometric features of the hand such as length of fingers and width of hand), odor (e.g., use of an individuals' odor), signature data, typing data (e.g., characteristics of a persons typing), vein data (e.g., vein patterns in human finger or palm, static, etc.), and other such biometric data.

In an aspect, the biometric data can be sourced (e.g., using sourcing component) from data feeds associated with user device 102 or other devices (e.g., smart phone, fitness wearable's, CPAP machines, data from medical examinations such as sleep studies, smart watches, etc.). In an aspect, a range of sensor technologies can be implemented within user device 102 or other such devices to facilitate the sourcing (e.g., using sourcing component 110) of biometric data. For instance, device 102 or other devices can utilize sensors such as high definition cameras (e.g., for capturing face biometric data), infrared cameras (e.g., for scanning eye components such as an iris), ultrasound devices (e.g., capable of picturing multiple layers of a fingerprint), sub-dermal imaging devices (e.g., capable of mapping palm and finger veins), gyroscope (e.g., within a smart phone), accelerometer (e.g., within a smart phone), light sensor (e.g., capable of measuring or reading light), temperature sensor (e.g., a temperature sensor that produces an output voltage based on the input temperature changes such as a thermocouple, thermistor, semiconductor temperature sensor, resistance temperature detector, etc.), infrared sensors, pressure sensors, proximity sensors, touch sensors (e.g., capacitance touch switch sensor, resistance touch switch sensor, piezo touch switch sensor, etc.), ultrasonic sensor, pulse sensor (e.g., capable of measuring a heartbeat for instance, by using optical heart rate sensor with amplification and circuit for noise reduction), galvanic skin response module (e.g., measures electrical conductance of the skin where the conductance can change according to the amount of sweat on the skin), myoware muscle sensor (e.g., measures the electrical activity of a muscle depending on the amount of activity in a muscle), finger heart rate sensor (e.g., measures the pulse in the finger by using infrared IR LED and an optical transistor in an instance), oxygen in blood sensor, airflow sensor, body temperature sensor, electrocardiogram sensor, blood pressure sensor, alcohol sensor (e.g., detect alcohol concentration on breath), and other such sensor technologies.

In another aspect, sourcing component 110 can source statistical data such as individualized personal user data. In an aspect the statistical data can include, but is not limited to personal data (e.g., GPS-tracked moving habits), typical user behavior data such as user typical routes travelled metrics, user typical tracks moved, user typical typing speed, typical typos performed using a keyboard, typical vocabulary used (e.g., general vocabulary, contextualized uses of vocabulary), search history information (e.g., typical websites visited), typical services used (e.g., how much time spent in particular applications and services such as social media applications and/or platforms, browsers, etc.), typical user preference data (e.g., cars, sports, travel, books, films, etc.), typical answers to standardized requests (e.g., evaluating chat data, email data, social media data, messaging data, etc.), typical marks passaged in internet of thing devices or applications (e.g., monitoring the time a person exits the apartment, the time entering the office, etc.), typical travel statistics (e.g., flies from Munich to Boston four times each year, but never visits India), and other such statistical data types.

In an aspect, device 102 can source (e.g., using sourcing component 110) the biometric data and statistical data from a range of sources such as devices capable of receiving, generating and/or transmitting biometric data, internet sources (e.g., applications, platforms, websites, and digital service providers). In another aspect, system 100 can employ generation component 120 to generates, by the user device 102, a set of identification data based on an interpolation of the set of biometric data and the set of statistical data. As such, generation component can utilize all the unique biometric data and statistical data of a user to create a digital DNA (dDNA) identity. In an aspect, user device 102, can transmit, at least a portion of the digital DNA identity to prove a user identity instantly and for a range of purposes.

Figure 2:
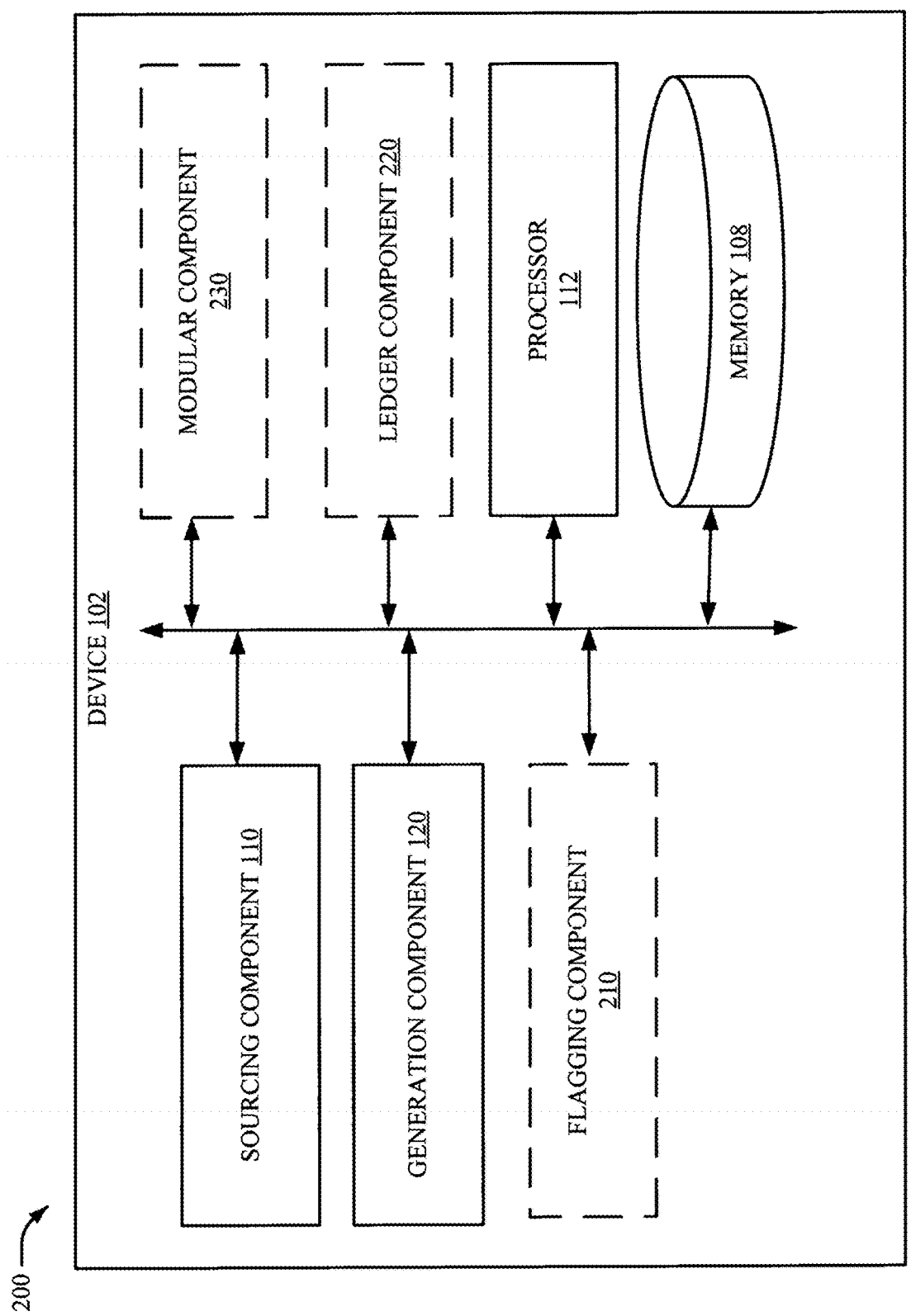
FIG. 2 illustrates a block diagram of an example, non-limiting system 200 that can facilitate a generation of customized identification data corresponding to a user device in accordance with one or more embodiments described herein.

Turning now to FIG. 2, illustrated is a block diagram of an example, non-limiting system 200 that can facilitate a generation of customized identification data corresponding to a user device in accordance with one or more embodiments described herein. Repetitive description of like elements employed in other embodiments described herein is omitted for sake of brevity.

In an aspect, system 200 can include a memory 108 that stores computer executable components and a processor 112 that executes the computer executable components stored in the memory 108. In an aspect, the computer executable components of system 200 can comprise a sourcing component 110 and a generation component 120. In another aspect, the computer executable components of system 200 can comprise a flagging component 210, a ledger component 220, and a modular component 230. In an aspect, processor 112 of device 102 can execute tasks, operations, and instructions employed by flagging component 210, ledger component 220, and modular component 230 and stored in memory 108.

In an aspect, flagging component 210 can iteratively assign a set of flag data to the set of biometric data and the set of statistical data respectively, wherein the set of flag data comprises a subset of time data and a subset of location data. As an example, the biometric data and statistical data sourced by sourcing component 110 can be coupled (e.g., using flagging component 210) with time data and/or global positioning satellite (GPS) data. Thus, the various subsets of data that interpolated together to generate (e.g., using generation component 210) the set of identification data can be updated and easily tracked using time data and GPS data. For instance, heartbeat data of a user can be sourced (e.g., using sourcing component 110) and coupled with a time stamp (e.g., time data) and GPS data to provide insights as to the behavior of a particular users' heart rate at various times and in various locations (e.g., sleeping at midnight everyday so the heart-rate goes down, exercises everyday at 6 am so the heart-rate goes up, etc.). In an aspect, each subsets of data relating to a corresponding data stream can be assigned (e.g., using flagging component 210) time data and location data.

As such, a transactional record associated with several subsets of data over a chained period of time (e.g., a users' lifetime) can be monitored, evaluated, and stored. In an aspect, these several subsets of sourced data feeds (e.g., biometric data and statistical data) can represent specific patterns of behavior and physical states of a user body. Furthermore, the data representing such unique behavioral patterns and physical states can represent multi-factorial identification data that is extremely difficult to fabricate. In several non-limiting embodiments, system 100 and system 200 can source several dozens of unique data feeds (e.g., factors) that can be rotated over time for use as contributors to generating the set of identification data. Furthermore, in an aspect, a subset of the total number of data feeds (e.g., 3 to 7 out of 12 data feeds) can be used at any specific moment in time to act as an identifier of an individual.

In an aspect, generation component 120 can interpolate data feeds associated with biometric data and statistical data corresponding to a target time data range and a target place data range and convert such interpolated data into mathematical values that are dynamic but act as a unique and concrete identification signature associated with each individual user. Thus, given a set of different different data points sourced (e.g., using sourcing component 110) from a range of biometric and statistical data sources, an intermediate value amongst all such variable data points can be generated (e.g., using generation component 120) that represents a set of identification data of a particular user. As such, processor 112 executes sourcing component 110 to perform identification mining of a particular user and as the body of sourced identification data grows over time, system 100 and system 200 can employ components that can detect evolutions in a user identification data signatures. Thus, in an aspect, the user's digital signature is never the same and always evolving.

Accordingly, the mining of identification data disclosed herein provides for identification frameworks that cannot be faked as is the case with one or two factor identification techniques that currently exist (e.g., username, password, text message confirmation, etc.). Furthermore, in an aspect, user device 102 can store program code and/or compatible hardware (e.g., memory 108) that can execute (e.g., processor 112) seamless identification and authorization identification data to perform everyday tasks. As such, no passwords are required by user device 102 and data lists can be generated from the wearable device and proprietary operating system to deliver or transmit this identification data at various venues and locations. In another aspect, the data that is sourced (e.g., using sourcing component 110) and generated (e.g., using generation component 120) can be owned and produced solely by the individual user whom such data corresponds with. A user has the ability to upload data feeds for sourcing by sourcing component 110 from social media accounts, e-mails, and other data feed sources, however, user device 102, in a non-limiting embodiment, may not purchase data from third parties. As such, user device 102 can source data that a user-owner permits such user device 102 to source.

In a non-limiting example, the user device 102 and system embodiments employed by user device 102 described herein provide for the generation of a digital DNA representing an identification tool customized to a particular user and making logins and passwords obsolete. Furthermore, a user need not provide personal information such as birth date, social security number, birth certificate or other private information to authenticate his identity. Instead, the identification data generated (e.g., using generation component 120) by user device 102 can provide for identification data that represents the strongest form of identity verification for a user to use in a range of settings to prove his or her identity. Accordingly, a user can wear his or her dynamic identity (e.g., wearing the user device 102) representing his or her own customized human patterns (e.g., biometric and statistical patterns).

In another non-limiting embodiment, system 200 can employ modular component 220 that switches the user device 102 between a personal mode and a professional mode based on a receipt of input switch data. For instance, user device can have a dynamic identity that function where the user device 102 can be switched from a home mode (e.g., personal mode) to a work mode (e.g., professional mode) or to a citizen mode (e.g., government recognizable and verifiable identity). For instance, data feeds associated with work habits, behaviors and patterns that occur during work hours can be sourced (e.g., using sourcing component 110) to generate a work dDNA and personal habits associated with personal life habits, behaviors, and patterns that occur outside of a users professional life can be sourced (e.g., using sourcing component 110) to generate a personal dDNA. Furthermore, a dDNA can be generated (e.g., using generation component 120) that allows a user to provide a government enforceable identity (e.g., "citizen dDNA) stored on the user device 102. As such, a user can utilize a citizen dDNA in lieu of a passport, drivers license, social security card and other such identity information to cross-borders, board airplanes, and perform a variety of tasks. In an aspect, other modes can include an invisible mode (e.g., no data is sourced at various times) and burner modes (e.g., can be disposed of at any given time). In another aspect, sourcing component 110 can source medical and/or pharmaceutical data for contribution to the dDNA identity. As such, medical data and/or pharmaceutical data can include behavioral data associated with prescription or non-prescription medicines (e.g., compliance data and usage patterns associated with taking medicines) and medical advisory automation data. In an aspect, the dDNA can be utilized to verify an identity for purposes of receiving medical assistance and/or accessing pharmaceutical drugs.

In an aspect, the identification or dDNA associated with user device 102 can change at all times and represent unique biometric and behavioral patterns that are impossible to replicate. In an aspect, a user dDNA can be utilized to gain access to activities and/or services. Furthermore, the user dDNA can allow a user to access and operate other devices such as internet of things (JOT) devices and/or sensors that can utilize the set of identification data to authenticate a user to access, operate or utilize any number of sensors. In an aspect, the set of identification data can grow as time persists and such identification data can change over time while still serving as a customized identity marker of a respective user. As such, in an aspect, the identity of a user corresponding to the set of identity data cannot be faked, replicated or stolen.

In another non-limiting embodiment, the dDNA or the set of identification data can represent a digital asset designed to work as a medium for verifying aspects of a users' identity and that replaces photo identification or document identification. In another aspect, subsets of identification data can represent cryptographic identification that can be mined from data corresponding to human patterns. As such, a community of miners can utilize computer hardware and software elements to assist in validating and time-stamping (e.g., time data) transactions corresponding to various data subsets. In an aspect, a transaction can include an occurrence of a data event (e.g., change or aberration in heartbeat, increase in pulse oxygen levels, change in status on a social media platform, etc.), such that the majority of miners attempt to maintain the ledger of transactions and can mine for rewards (e.g., transaction fees, currency) associated with unlocking blocks within a block-chain that record identity data transactions. Accordingly, the set of identification data can grow at all times and act as a cryptoID that cannot be faked.

In another aspect, system 200 can employ a ledger component 230 that stores the set of identification data within cryptographic blocks at a regular interval corresponding to a block chain mechanism. In an aspect, ledger component 230 can store subsets of identification data in distributed encrypted storage locations. For instance, subsets of data or individual data points associated with subsets of identification data can be stored in a peer-to-peer cloud storage system that protect files, data, and other information on nodes of the cloud storage system and while such data is transmitted and/or processed based on a block-chain technology and cryptography that encrypts the data. In an aspect, a user can store data in a secure and decentralized manner over a distributed cloud storage system using ledger component 230. Furthermore, in an aspect, blockchain features such as ledgers, cryptographic hash functions and/or public/private key encryption techniques can be utilized to monitor, track, store, access, and transmit data.

In an aspect, ledger component 230 can facilitate storing identification data within blockchain storage mechanisms such that users control their own data and devices. The blockchain also decentralizes the storage mechanism because data is not stored on a central server thus lowering the vulnerability of data to theft. Furthermore, in an aspect, the encryption (e.g., client-side) aspects associated with such storage mechanisms allow only end-users (e.g., user device 102) to have access to un-encrypted files and encryption keys. In an instance, a third part cannot tamper with user identification data such that the distributed cloud storage mechanism stores only hashes of data blocks and such hashes of data are encrypted and distributed while acting as verifiers of the data blocks. In another instance, the identification data and time stamp data can be stored in a distributed and encrypted form within a sequential chain of blocks within the block chain where each block contains a cryptographic hash to identify each block.

As such, the links cryptographic hashes link the blocks and the subsets of incremental (e.g., time stamped) identification data thus creating (e.g., using ledger component 230) a decentralized transaction ledger of identification data. In yet another aspect, the blockchain technology can be utilized as a self-verifying sequential storage scheme that can immutably record transactions, or identification data over time. Accordingly, in an aspect, the trackers of data can be utilized internally such that each bite of identification data cannot leave a user's account without such user providing permission and at any given time. As such, the technology of system 100 and system 200 can include a single sign on mechanism that facilitates access to multiple software systems without utilizing a username or password.

In a non-limiting embodiment, system 100 and system 200 can employ sourcing component 110 to source real time biometric data of a user such as a unique heartbeat data, unique voice pattern data, unique body walk data, and fingerprint confirmation data. Furthermore, sourcing component 110 can source real-time user behavioral statistics such as GPS habit data, internet behavior data, payment behavior data, and/or timeframe data. In another aspect, ledger component 230 can store the real-time biometric data and the real-time behavioral statistics data within blocks of the blockchain where each subset of biometric data and behavioral statistics data can be associated with different time data. In an aspect, the biometric data and behavioral statistics data stored within the block chain can generate a blockchain-based identity and a block-chain storage mechanism (e.g., within a distributed cloud network) which both contributes to trust and transparency of the stored data. In another aspect, the real-time biometrics data and the real-time behavioral statistics data can be interpolated and stored within a blockchain-based network to form a dDNA identity. The dDNA identity can comprise real-time biometrics, real-time behavioral statistics and include the trust and transparency of the grid corresponding to the blockchain technology.

In an aspect, the disclosed technology can block all trackers, such as platforms that track a user (e.g., social media, software applications, platform tracking, etc.), and instead encrypt and store all user data within a decentralized (e.g., blockchain based) storage network. Furthermore, a developer seeking to utilize such data can be directed to executing an end user licensing agreement (EULA) that imposes a "do not gather" compliance policy. Thus, the technology can result in a prohibitions of tracking a user via data, soliciting users via advertisements, infecting systems with viruses, imposing white noise digital camouflage features within a user system, and other troublesome vulnerabilities. In an aspect, the technology can also provide or emit white noise data such that potential data thieves and trackers can be lead on a fake trail that block such trackers from services. For instance, various online magazine organizations do not entitle users to read the website if an advertising blocker is utilized. As such, a user can feed fake data to another such that the user can access services and goods requiring the dDNA identity but also remain incognito, have privacy, and not view advertisements.

Figure 3:
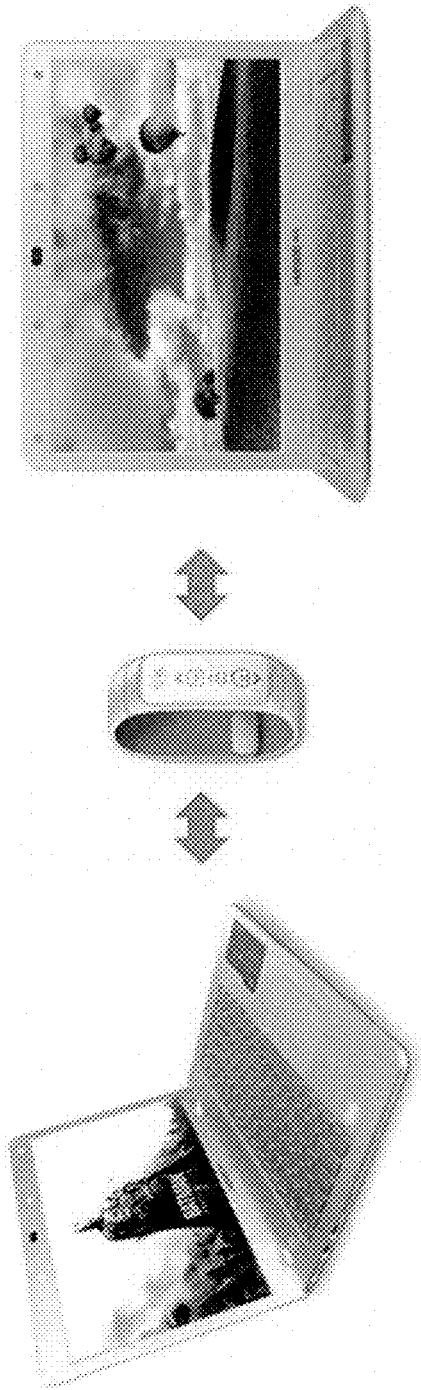
FIG. 3 illustrates a diagram of an example, non-limiting system 300 that can facilitate a switching between various user profile's associated with subsets of identity data respectively in accordance with one or more embodiments described herein.

Turning now to FIG. 3, illustrated is a diagram of a user switching user device 102 modes (e.g., using modular component 220). For instance, the user can allow for personal profile data and corporate profile data to be contained within separate smart encrypted data containers in order to keep user private and work lives separated. In an instance, a user can utilize a shopping profile within the personal profile data contained in a first smart encrypted data container to allow for predictive commercial offers to be transmitted to a user (e.g., user device 102) based on a behavior analysis of a user personal profile data. In an aspect, the user has control over whether to grant permissions to use its data for particular purposes.

Furthermore, a user can compartmentalize particular data such that all of a user data need not be revealed for various purposes such as verifying an identity, procuring respective services, obtaining various goods, and other such purposes. In another aspect, modular component 220 can store data associated with particular data feeds into a segmented storage environment and the data associated with the multiple data feeds at a moment in time can be time stamped. Thus, the user can gain access to such segmented data in different settings. For instance, GPS location data and heartbeat data can be stored in separate data stores and can be separated by time and date. As such, in a non-limiting embodiment, data sets can be isolated and stored with its own encryption key based on a time metric (e.g., GPS data within a 24 hour time frame can be stored in a first data "cube", heartbeat data over the past 48 hours can be stored in a second data "cube"). In an aspect, each day can have a different data store for particular data sets (e.g., data can be segmented by time and data type).

Figure 4:
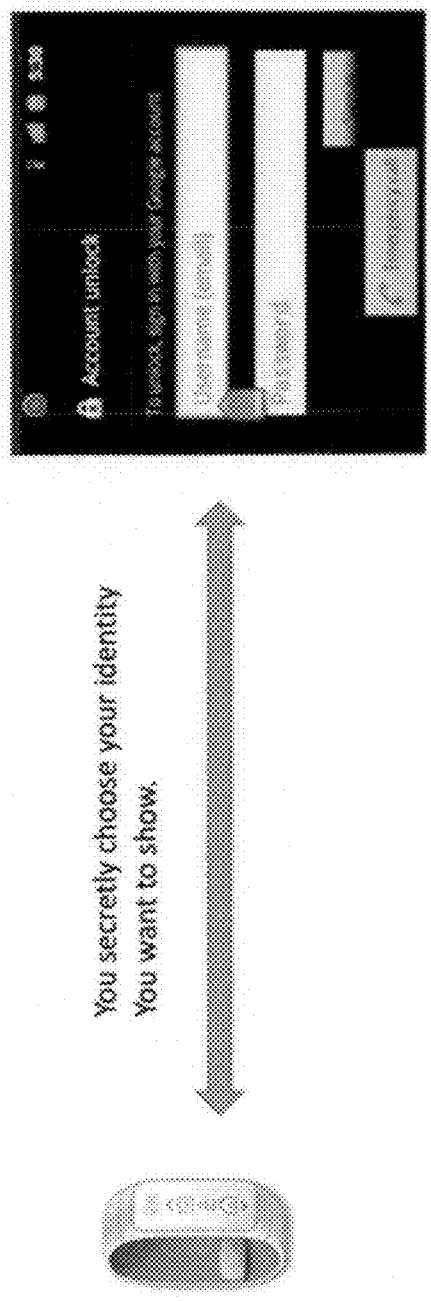
FIG. 4 illustrates a diagram of an example, non-limiting system 400 that can facilitate a selection of a user profile associated with respective subsets of identity data in accordance with one or more embodiments described herein.

Turning now to FIG. 4, illustrated is a non-limiting example of user device 102 employing a system 100 or 200 component to select an identity profile to prove such user's identity in a respective setting. In an aspect, user device 102 can employ system 100, system 200 or other embodiments disclosed herein. In an aspect, each respective embodiment allows for a user to control the identity data to display to a third party (e.g., software system, software platform, etc.). For instance, a user can sign on to a user account by transmitting a selected subset of data from device 102 for receipt by the hardware and software components associated with executing the user account. In another instance, a user can unlock user device 102 and select a particular data profile to transmit or display to another entity (e.g., work profile, citizen profile, personal profile, etc.) to prove the user identity. As such, the user can keep much of the user data secretive while complying with requests to prove the user identity.

Figure 5:
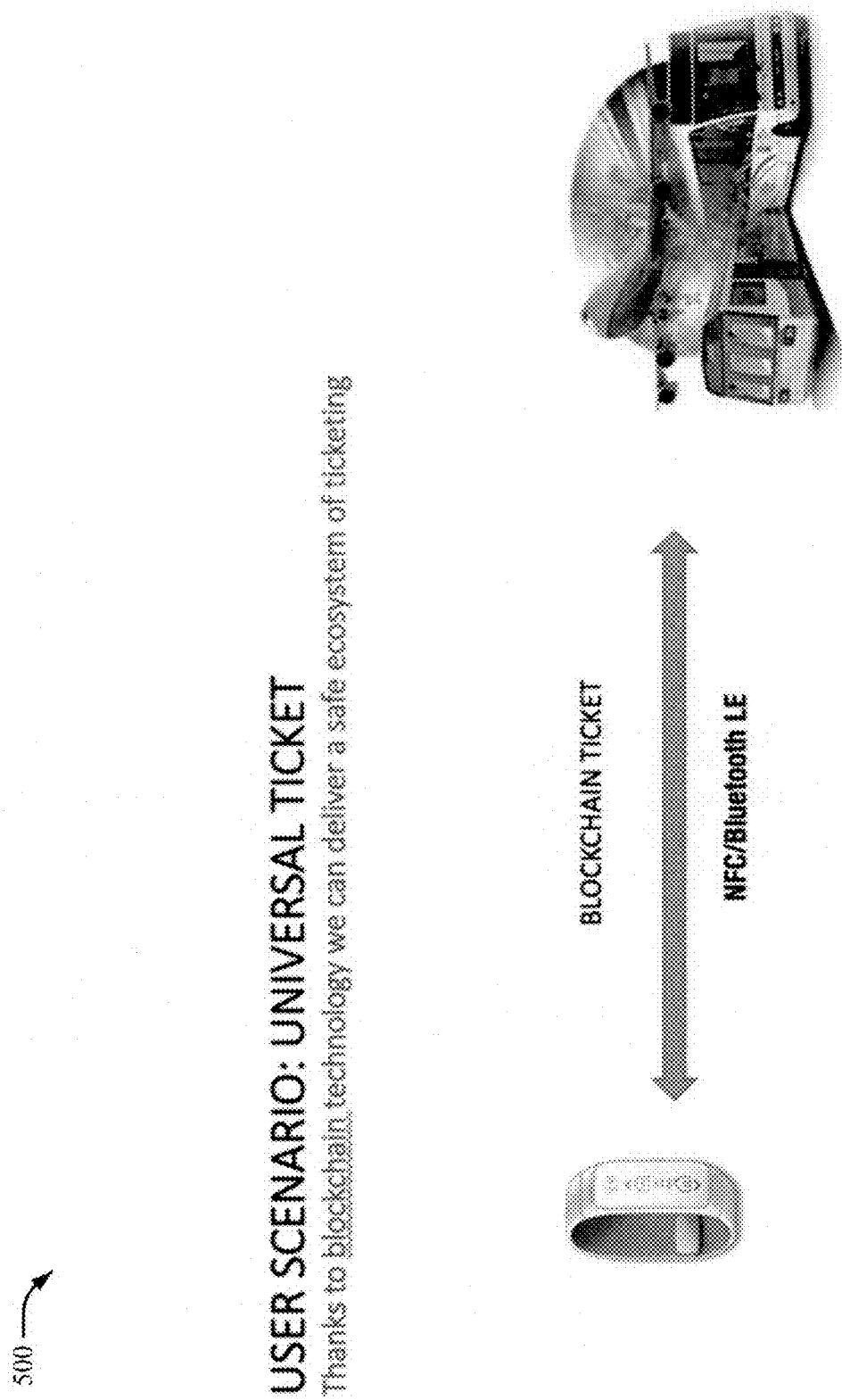
FIG. 5 illustrates a diagram of an example, non-limiting system 500 that can facilitate access to a ticketing ecosystem using identity data in accordance with one or more embodiments described herein.

Turning now to FIG. 5, illustrated is a non-limiting example of user device 102 employing a system 100 or 200 component to select an identity profile to prove such user's identity in order to obtain permission or tickets for travel. In an aspect, user device 102 can employ blockchain technology to utilize the user device 102 within a ticketing ecosystem. For instance, a ticket can be obtained through the blockchain and user device 102 can access such ticket data within the block chain and transmit data associated with the ticket via a NFC or Bluetooth® transmission.

Figure 6:
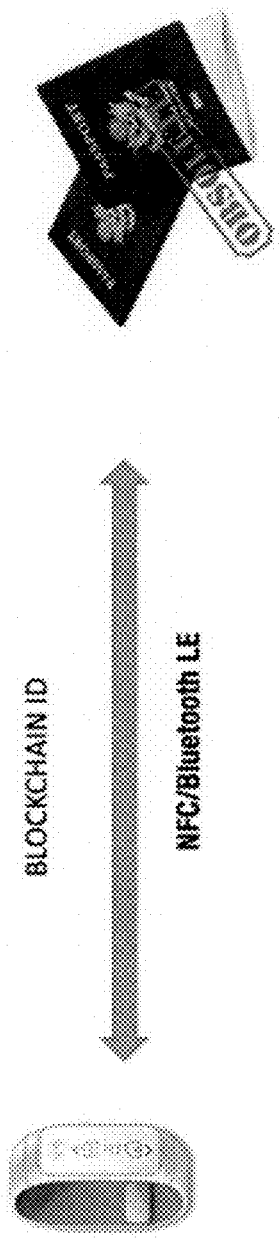
FIG. 6 illustrates a diagram of an example, non-limiting system 600 that can facilitate access to places, goods and services requiring government authentication using identity data in accordance with one or more embodiments described herein.

Turning now to FIG. 6, illustrated is a non-limiting example of user device 102 employing a system 100 or 200 component to select an identity profile to prove such user's identity in a scenario typically requiring procurement of a government issued identification. In an aspect, a user can utilize its cryptoID or dDNA on user device 102 that relates to a citizen profile. For instance, a user can select its government-controlled personality profile on user device 102 that presents identity data rising to the level of validity that a government can recognize in order to access government-regulated services, such as banks or crossing the border. For instance, such citizen profile identity data can be obtained through the blockchain and user device 102 can access such data within the block chain and transmit such data via a NFC or Bluetooth® transmission.

Figure 7:
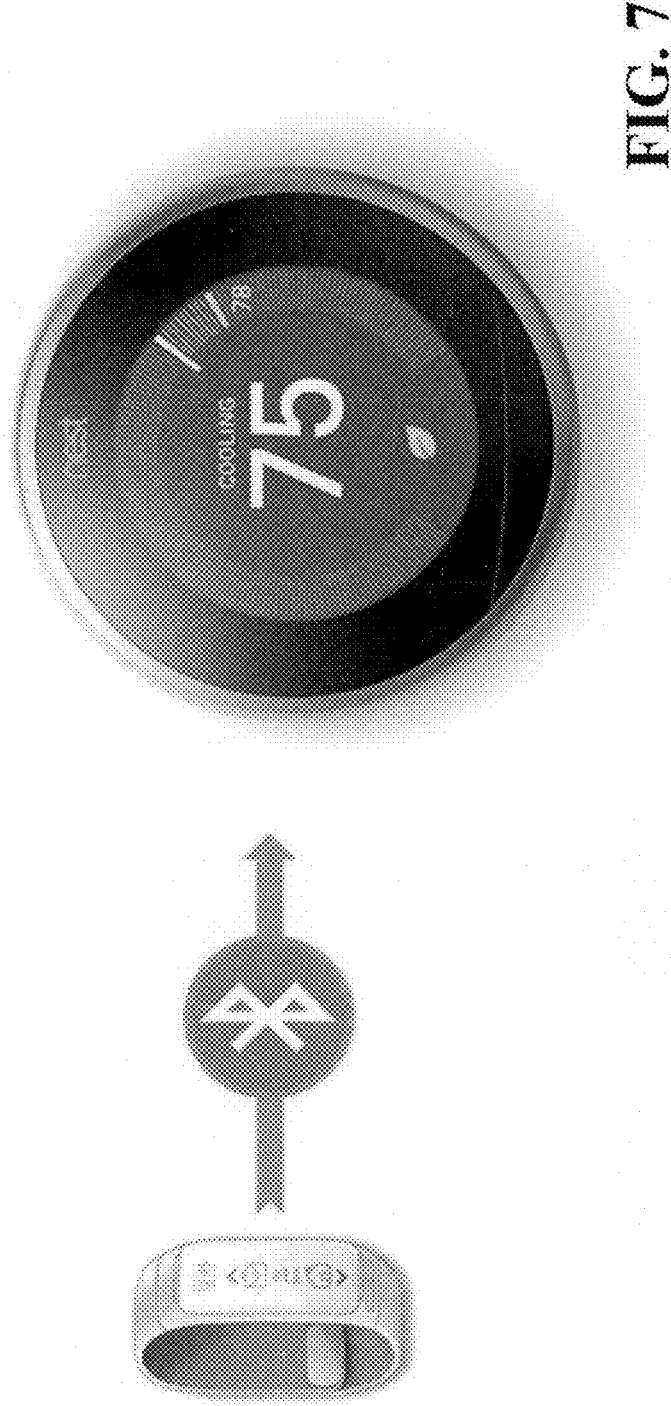
FIG. 7 illustrates a diagram of an example, non-limiting system 700 that can facilitate a performance of operations related to internet of things enabled devices using identity data and devices employing identity data in accordance with one or more embodiments described herein.

Turning now to FIG. 7, illustrated is a non-limiting example of user device 102 employing a system 100 or 200 component to select an identity profile to control devices comprising sensors or internet of things empowered devices. For instance, a user can control a climate setting by using device 102. In an aspect, the user can wave down to achieve a lower temperature and adjust a digital thermostat temperature downward or wave up to achieve a higher temperature and adjust the digital thermostat temperature upward. As such, user device 102 can receive gesture information (e.g., using gesture activated sensors) and also transmit commands to other devices based performance of gestures or other executable tasks.

In general, the disclosed invention allows a user to automatically access things they need while living life in a typical manner. The invention does not require the use of usernames and passwords to access services used everyday and therefore the systems and devices disclosed herein do not face storage issues associated with complex passwords for each service. Furthermore, the disclosed technology is not vulnerable to security breaches associated with typical username and password access mechanisms. In an aspect, user device 102 in connection with system 100, system 200, and other disclosed embodiments makes use of data associated with each user behavior given that each user behaves in a different manner and each user has a different total biological make-up as compared to other uses.

The disclosed systems source large amounts of data from data feeds and time stamp segments of each data feed. As such, several unique user patterns corresponding to respective data feeds are received and time stamped simultaneously. Furthermore, each user conducts a different task, activity, operation, behavior, or biological functioning at a given point in time. At least a portion of the data feeds or a total collection of the sourced data feeds contribute to the generation of a dynamic identifier (e.g., dDNA) that is constantly changing. Furthermore, the disclosed systems allow for privacy of data feeds in that the data feeds are always encrypted. As such, the blockchain allows for the dDNA data to be contained in a chain of blocks where each block will stay the same but only the user can decrypt the data. Furthermore, the data cannot be changed within the blockchain. In another aspect, a user can choose the data that represents their identity at a given time by transmitting identity data associated with a particular profile (e.g., personal profile, work profile, corporate profile) where such data is different as a user is participating in a different role throughout the day (e.g., worker, homemaker, etc.).

Furthermore, in an aspect, sourcing component 110 can source multiple data feeds including external internet of thing device data (e.g., via API/SSO), external web services data (e.g., integration via API/SSO), own ecosystem services/applications/daemons/other such AI-scripted services, own ecosystem of internet of things/daemeons/AI-scripted services, data that has been profile mined (e.g., parental digitalDNA, time data, place data, and miscellaneous digital DNA data). As such, the data feeds can also be sourced for compensation (e.g., via an online payment provider chosen from a list or inherited). Furthermore, in an aspect, full data math can be performed in real-time to create a digital DNA profile for the user. In an aspect, the dDNA can be compartmentalized in a range of manners including, but not limited to, life goals dDNA, habit dDNA, purchase dDNA, sports & health dDNA, average spent per transaction dDNA, travel dDNA, gaming dDNA, and other such profiles. In another aspect, the data can be transmitted according to policies, rules and permissions allowed by the user and such transmitted or shared data can be priced based on a subscription or automation model for transacting over a data market. A user can also receive money in exchange for data provided over a data market. Thus, a user can utilize identity data to verify its identity and/or share with third parties for money.

In another aspect, a user beginning to create a dDNA can utilize the dDNA's and corresponding patterns associated with such users' parents. Thus, the parental dDNA can be used in part of the mathematical determinations used to generate the dDNA of the child-user. Also, other unique data feeds can contribute to the initial identity of a user (e.g., country of origin from which user gains access to the online environment, weather conditions at the time of initial online activity, biometric information such as tone of voice, etc.). Furthermore, given that data (e.g., biometric data) contributing to the dDNA is constantly generated, the identity can be generated as a work-in progress by the disclosed systems. As such, the identity gains trustworthiness and credibility each passing moment as more data is generated that contributes the uniqueness of the user identity. Therefore, the identity is extremely difficult to copy or fake. Accordingly, the disclosed systems that facilitate a generation of dDNA by seamlessly interacting with the digital and physical world around a user, can allow a user to use technology that is centered around that user rather than a brand, advertisement, company or third party. Furthermore, a user can analyze his or her own behavior and user device 102 in connection with the system embodiments disclosed herein can recommend behaviors to obtain better health, effective education, using proper medicines, automating routine tasks (e.g., paying bills, assembling and filing taxes, etc.), automating shopping (e.g., common purchases performed automatically), creating cybersecurity protections, travelling efficiently (e.g., optimizing the infrastructure to travel common routes easier and faster), comply with legal rules easier (e.g., requesting or revealing specific rather than all data pursuant to a warrant, etc.), and other such behaviors.

In another aspect, the systems and devices disclosed herein can be implemented by several parties or technologies, and industry areas such as internet of things manufacturers, automobile manufacturers, computer/laptop/smartphone manufacturers, governments (e.g., smart cities), medicine (e.g., pharmaceutical manufacturers), banks, Hotel/Restaurant/Café industries, military, dating services, robotic developers, bionics (e.g., smart implants), biochips (e.g., embedded and implanted dDNA), and other parties, technologies and industries.

Figure 8:
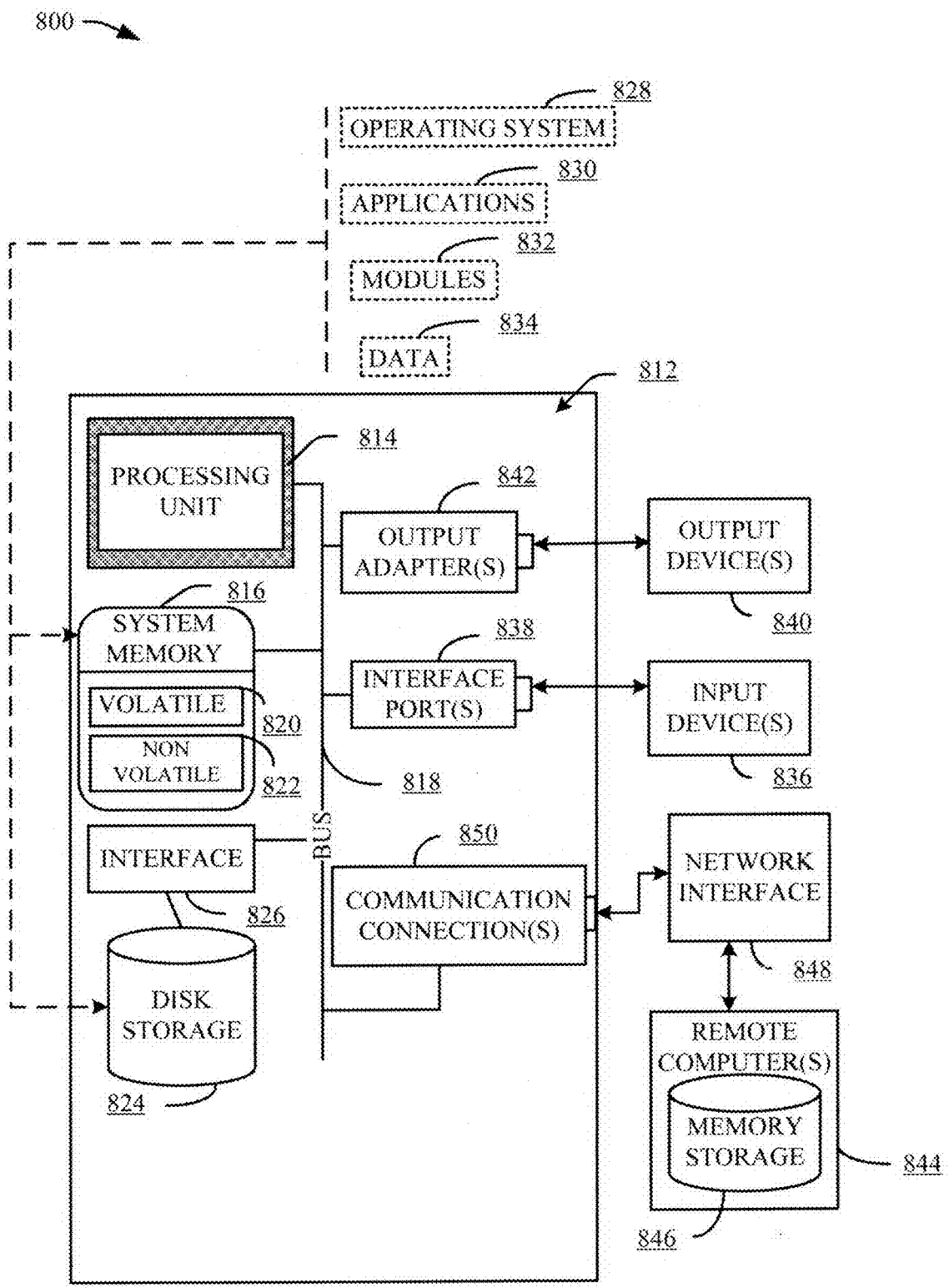
FIG. 8 illustrates a block diagram of an example, non-limiting operating environment 1600 in which one or more embodiments described herein can be facilitated.

In order to provide a context for the various aspects of the disclosed subject matter, FIG. 8 as well as the following discussion is intended to provide a general description of a suitable environment in which the various aspects of the disclosed subject matter can be implemented. FIG. 8 illustrates a block diagram of an example, non-limiting operating environment in which one or more embodiments described herein can be facilitated. With reference to FIG. 8, a suitable operating environment 800 for implementing various aspects of this disclosure can also include a computer 812. The computer 812 can also include a processing unit 814, a system memory 816, and a system bus 818. The system bus 818 couples system components including, but not limited to, the system memory 816 to the processing unit 814. The processing unit 814 can be any of various available processors. Dual microprocessors and other multiprocessor architectures also can be employed as the processing unit 814. The system bus 818 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI).

The system memory 816 can also include volatile memory 820 and nonvolatile memory 822. The basic input/output system (BIOS), containing the basic routines to transfer information between elements within the computer 812, such as during start-up, is stored in nonvolatile memory 822. By way of illustration, and not limitation, nonvolatile memory 822 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). Volatile memory 820 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 812 can also include removable/non-removable, volatile/non-volatile computer storage media. FIG. 8 illustrates, for example, a disk storage 824. Disk storage 824 can also include, but is not limited to, devices like a magnetic disk drive, floppy disk drive, tape drive, Jaz drive, Zip drive, LS-100 drive, flash memory card, or memory stick. The disk storage 824 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 824 to the system bus 818, a removable or non-removable interface is typically used, such as interface 826. FIG. 8 also depicts software that acts as an intermediary between users and the basic computer resources described in the suitable operating environment 800. Such software can also include, for example, an operating system 828. Operating system 828, which can be stored on disk storage 824, acts to control and allocate resources of the computer 812.

System applications 830 take advantage of the management of resources by operating system 828 through program modules 832 and program data 834, e.g., stored either in system memory 816 or on disk storage 824. It is to be appreciated that this disclosure can be implemented with various operating systems or combinations of operating systems. A user enters commands or information into the computer 812 through input device(s) 836. Input devices 836 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 814 through the system bus 818 via interface port(s) 838. Interface port(s) 838 include, for example, a serial port, a parallel port, a game port, and a universal serial bus (USB). Output device(s) 840 use some of the same type of ports as input device(s) 836. Thus, for example, a USB port can be used to provide input to computer 812, and to output information from computer 812 to an output device 840. Output adapter 1242 is provided to illustrate that there are some output device 840 like monitors, speakers, and printers, among other such output device 840, which require special adapters. The output adapters 842 include, by way of illustration and not limitation, video and sound cards that provide a means of connection between the output device 840 and the system bus 818. It should be noted that other devices and/or systems of devices provide both input and output capabilities such as remote computer(s) 844.

Computer 812 can operate in a networked environment using logical connections to one or more remote computers, such as remote computer(s) 844. The remote computer(s) 844 can be a computer, a server, a router, a network PC, a workstation, a microprocessor based appliance, a peer device or other common network node and the like, and typically can also include many or all of the elements described relative to computer 812. For purposes of brevity, only a memory storage device 846 is illustrated with remote computer(s) 844. Remote computer(s) 844 is logically connected to computer 812 through a network interface 848 and then physically connected via communication connection 850. Network interface 848 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection (s) 850 refers to the hardware/software employed to connect the network interface 848 to the system bus 818. While communication connection 850 is shown for illustrative clarity inside computer 812, it can also be external to computer 812. The hardware/software for connection to the network interface 848 can also include, for exemplary purposes only, internal and external technologies such as, modems including regular telephone grade modems, cable modems and DSL modems, ISDN adapters, and Ethernet cards.

Referring now to FIG. 9, there is illustrated a schematic block diagram of a computing environment 900 in accordance with this disclosure. The system 900 includes one or more client(s) 902 (e.g., laptops, smart phones, PDAs, media players, computers, portable electronic devices, tablets, and the like). The client(s) 902 can be hardware and/or software (e.g., threads, processes, computing devices). The system 900 also includes one or more server(s) 904. The server(s) 904 can also be hardware or hardware in combination with software (e.g., threads, processes, computing devices). The servers 904 can house threads to perform transformations by employing aspects of this disclosure, for example. One possible communication between a client 902 and a server 904 can be in the form of a data packet transmitted between two or more computer processes wherein the data packet may include video data. The data packet can include a metadata, e.g., associated contextual information, for example. The system 900 includes a communication framework 906 (e.g., a global communication network such as the Internet, or mobile network(s)) that can be employed to facilitate communications between the client(s) 902 and the server(s) 904.

Communications can be facilitated via a wired (including optical fiber) and/or wireless technology. The client(s) 902 include or are operatively connected to one or more client data store(s) 908 that can be employed to store information local to the client(s) 902 (e.g., associated contextual information). Similarly, the server(s) 904 are operatively include or are operatively connected to one or more server data store(s) 910 that can be employed to store information local to the servers 904. In one embodiment, a client 902 can transfer an encoded file, in accordance with the disclosed subject matter, to server 904. Server 904 can store the file, decode the file, or transmit the file to another client 902. It is to be appreciated, that a client 902 can also transfer uncompressed file to a server 904 and server 904 can compress the file in accordance with the disclosed subject matter. Likewise, server 904 can encode video information and transmit the information via communication framework 906 to one or more clients 902.

The present disclosure may be a system, a method, an apparatus and/or a computer program product at any possible technical detail level of integration. The computer program product can include a computer readable storage medium (or media) having computer readable program instructions thereon for causing a processor to carry out aspects of the present disclosure. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present disclosure can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
one or more processors; and
one or more storage devices comprising processor executable instructions that, responsive to execution by the one or more processors, cause the system to perform operations comprising:
sourcing, by a user device, biometric data, transactional data, activity data and statistical data corresponding to a user from a set of data sources corresponding to a set of data feeds;
interpolating subsets of the set of data feeds into identification data representing a series of multi-factorial identification signatures of a user corresponding to the user device;
generating, by the user device, a first multi-factorial identification signature of the user corresponding to the user device, wherein the first multi-factorial identification signature is based at least on an interpolation of a first subset of biometric data and a first subset of statistical data; and
controlling, by the user device, a disclosure of the first multi-factorial identification signature to a first identification requesting device based on first control input received by the user device, wherein the first multi-factorial identification signature satisfies first identity verification requirements of the first identification requesting device.

2. The system of claim 1, wherein the operations further comprise iteratively assigning a set of flag data to the set of biometric data and the set of statistical data respectively, wherein the set of flag data comprises a subset of time data and a subset of location data, and wherein the set of flag data enables a procurement of behavioral insights corresponding to the user.

3. The system of claim 1, wherein the operations further comprise storing the set of identification data within a blockchain storage mechanism comprising cryptographic blocks at a predefined interval corresponding to a block chain mechanism.

4. The system of claim 1, wherein the operations further comprise interpolating a subset of the set of data feeds to generate a subset of the multi-factorial identification signature corresponding to the user device, wherein a subset of the multi-factorial identification signature corresponds to at least one of a personal mode, an incognito mode, a burner mode, a citizen mode, or a professional mode of the user device based on a receipt of input switch request data.

5. The system of claim 1, wherein the operations further comprise generating a secure record of transactions and activities corresponding to the set of data feeds, and wherein the operations further comprise the user device as a wrist-mountable bracelet.

6. The system of claim 1, wherein the operations further comprise:
generating a second multi-factorial identification signature of a user corresponding to the user device, wherein the second multi-factorial identification signature is based at least on an interpolation of a second subset of biometric data and a second subset of statistical data, wherein the second multi-factorial identification signature represents a different set of behavioral patterns and physical states that correspond to an identity of the user device; and
controlling, by the user device, a disclosure of the second multi-factorial identification signature, to a second identification requesting device based on second control input received by the user device, wherein the second multi-factorial identification signature satisfies second identity verification requirements of the second identification requesting device, wherein the second identity verification requirements are different than the first identity verification requirements.

7. The system of claim 1, wherein the biometric data comprises at least one of heartbeat pattern data, voice pattern data, walking pattern data, metabolic data, gestural data, wake pattern data, sleep pattern data, visual pattern data, facial pattern data, fingerprint recognition data, finger geometry data, hand geometry data, odor data, signature data, or typing data.

8. The system of claim 1, wherein the set of data sources comprise at least one of a sensor, camera, sub-dermal imaging device, ultrasound device, gyroscope, accelerometer, light sensor, temperature sensor, pulse sensor, galvanic skin response module, muscle sensor, blood sensor, airflow sensor, typing behavior data store, personal behavior data store, search history data store, and device application data store.

9. The system of claim 1, wherein a version of the multi-factorial identification signature comprises user specific longitudinal transaction data, physical state data, and behavioral pattern data representing an untampered user identifier or authentication signature.

10. The system of claim 1, wherein the operations further comprise mining discrete identification data for interpolation from the set of data feeds into variant multi-factorial identification signatures.

11. The system of claim 1, wherein the operations further comprise verifying, by the user device that the user possesses the user device based on a comparison between current biometric data and current statistical data of a possessor of the user device compared to a transactional record of historical biometric data and historical statistical data associated with the user.

12. The system of claim 1, wherein the operations further comprise interpolating data feeds associated with work habits, behaviors and patterns to generate a first multi-factorial identification signature that represents a work digital DNA corresponding to the user.

13. The system of claim 1, wherein the operations further comprise interpolating data feeds associated with personal habits, behaviors and patterns to generate a first multi-factorial identification signature that represents a personal digital DNA corresponding to the user.

14. The system of claim 6, wherein the wrist-mountable bracelet is configured with a control module that permits another user device to access the subset of the multi-factorial identification signature that is at least one of a personal multi-factorial identification signature, an incognito multi-factorial identification signature, a burner multi-factorial identification signature, a citizen multi-factorial identification signature, or a professional multi-factorial identification signature based on a control command of the wrist-mountable bracelet.

15. The system of claim 1, wherein the operations further comprise blocking trackers from tracking the biometric data and the statistical data and the statistical data by user devices that are not the user device based on storage of the biometric data and the statistical data at a decentralized storage network.

16. The system of claim 1, wherein the operations further comprise transmitting white noise data to tracker technologies, wherein the white noise data inhibits a tracking of the biometric data and the statistical data.

17. The system of claim 1, wherein the operations further comprise storing data types of the user device at encrypted data containers with a data store.

18. The system of claim 17, wherein the operations further comprise permitting, by the user device, a data type of the data types stored within an encrypted data container, wherein the data type is permitted for transmission to a target recipient device.

19. The system of claim 1, wherein the operations further comprise enabling the user device to release a subset of the biometric data and a subset of the statistical data that is relevant to a recipient for a targeted purpose.

20. The system of claim 1, wherein the operations further comprise accessing, by the user device, an account profile corresponding to the user device based on a transmission of a select subset of biometric data and a select subset of statistical data that correspond to an identity of a permitted user of the user device.

* * * * *